D. J. McCARTHY.
AUTOMATIC BLOCK SIGNALING SYSTEM.
APPLICATION FILED OCT. 30, 1913.
Reissued Mar. 3, 1914.
13,693.
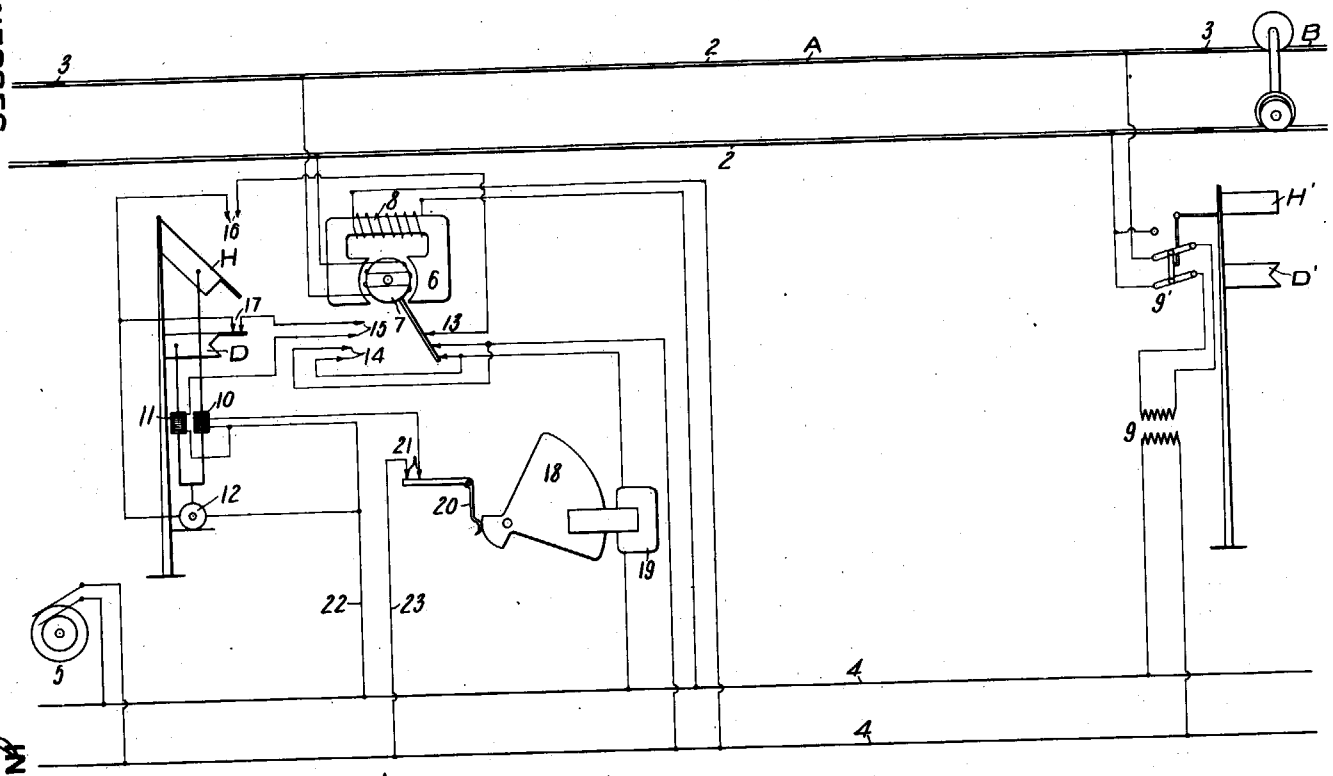
WITNESSES
W. T. Holman
A. L. Venable
INVENTOR
Daniel J. McCarthy
By Geo. E. Crane
His Atty.
COLUMBIA PLANOGRAPH CO., WASHINGTON, D. C.

UNITED STATES PATENT OFFICE.

DANIEL J. McCARTHY, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

AUTOMATIC BLOCK-SIGNALING SYSTEM.

13,693. Specification of Reissued Letters Patent. Reissued Mar. 3, 1914.

Original No. 867,563, dated October 1, 1907, Serial No. 388,750. Application for reissue filed October 30, 1913. Serial No. 798,376.

*To all whom it may concern:*

Be it known that I, DANIEL J. McCARTHY, of Wilkinsburg, Allegheny county, Pennsylvania, have invented a new and useful Automatic Block-Signaling System, of which the following is a full, clear, and exact description, reference being had to the accompanying drawing, forming part of this specification, in which the figure is a diagram illustrating my invention.

My invention has relation to automatic block signal systems employing home and distant signals, and of that character in which the distant signals are operated by the track circuit without the use of separate wires or conductors therefor, control being effected by reversing the polarity of the track circuit by a pole changer operated by the home signal, both home and distant signals being controlled from a polarized track relay. The contacts on this relay are so arranged that either the operating circuit for the home signal alone or the circuits for both the home and distant signals can be closed, depending upon the polarity of the track circuit. When the home signal is clear, the shifting of the contacts to clear the distant signal causes a momentary break in the circuit to the home signal, and where electric signals using slots are employed, it is necessary to so design these slots that they will not release during this momentary pause of current, since such release would cause the home signal to move to danger position. In direct current systems of this character, this is accomplished by placing a copper tube over the cores of the slot magnets so that when the current in the slot coils is interrupted a current will be induced in these tubes, thereby causing a magnetic flux in the cores of the slot magnets to hold their armature down during the momentary pause of current in the slot coils, and giving said coils a slow release. When alternating current signals are employed, however, with alternating current slot magnets, these copper tubes cannot be used on the cores of the slot magnets, and it is necessary to provide some other means to give these magnets a slow release so that they can be adapted to the polarized track system.

The object of my invention is to provide means of this character, whereby alternating current slot magnets can be used in a system of wireless control for distant signals similar to those now in use in direct current systems having direct current slot magnets; and my invention consists in the provision of an auxiliary circuit-controlling device which will hold the circuit of the slot magnet for the home signal closed during the time the main relay is moving from one of its operative positions to the other.

The precise nature of my invention will be best understood by reference to the accompanying drawings, which will now be described, it being premised, however, that the various parts are there shown diagrammatically and that the invention is susceptible of various modifications and embodiments.

In this drawing, the numeral 2 designates the track rails, which are divided by insulated joints 3 into blocks or sections A and B.

4 designates a pair of line wires, which are supplied by an alternating current generator 5.

6 is a three-position alternating current relay, whose armature windings 7 are shown as connected across the rails 2 of the block or section A, and whose field windings 8 are connected across the line wires 4. If desired, however, this arrangement of the windings may be reversed, the field windings being connected across the track rails, and the armature windings across the line wires.

The track rails 2 are energized by the secondary coil of a transformer 9, whose primary coil is connected across the line wires, the secondary coil being connected to the rails through a pole changer 9′ operated by a connection with the home-signal blade H′ for the block or section B.

D′ is the distant signal blade for the block B; H the home signal blade for the block A, and D is the distant signal blade for the block A.

10 and 11 designate the respective slot-magnets for the home and distant signal blades H and D. These two blades are operated by the one motor 12, the slot magnets 10 and 11 constituting the selective means of well-known character by which the respective blades can be cleared independently of each other.

The armature 7 has a central neutral position, and two operative positions. In one of these operative positions it connects the contacts 13, and in the other position it connects the set of contacts 14 which are in multiple with two of the contacts 13, and also the second set of contacts 15 which control the circuit of the distant signal. The signal blade H also controls the contacts 16 to close the circuit of the motor 12 when said blade is at danger position, and the signal blade D controls the set of contacts 17, which are also in the motor circuit and in series with one of the contacts 15.

18 designates an auxiliary relay, having an actuating coil 19 connected across the line wires through the contacts 13 or 14, according to the position of the main relay. The rotor member of this auxiliary relay actuates a circuit closer 20, which, when the relay is in the position shown, closes the contacts 21 to complete the circuit of the slot magnet 10 through conductors 22 and 23 connected to the respective line wires. This breaker is of slow-acting type, this being indicated in the diagram by showing that a considerable movement of the rotor member will take place before the circuit breaker will move to its open position.

When the block A is occupied by a train, the armature winding of the relay 6 is short circuited, and this relay is in its neutral position. This opens the contacts 13, 14 and 15 and all the local circuits to the home signal H and distant signal D, causing these signals to indicate a danger condition. When the train passes into the block B as shown in the drawing, the armature of the relay 6 is energized, thereby closing the contacts 13. This closes the local circuit to the motor 12 of the signals H and D, and also closes the local circuit of the auxiliary slow-releasing relay 18 which closes the contacts 21 and thereby causes the coil of the slot magnet 10 to be energized. As the signal H clears, the circuit of the motor 12 is broken at 16, and the signal H is held at clear position by the slot magnet 10, it being energized from the line wires 4 through the contacts 21.

When the train passes out of the block B, the home signal H′ is cleared. In clearing it operates the pole changer 9′, which reverses the polarity of the track circuit in the block A, causing the armature of relay 6 to reverse its direction of rotation. This breaks the circuit at the contacts 13 and closes the circuits at the contacts 14 and 15, thereby closing the local circuit to the motor 12 and the slot magnet 11, which causes the clearing of the distant signal D. As this signal clears the circuit of the motor 12 is broken at the contact 17. It will be noted that as the armature of the relay 6 moves from the contacts 13 to the contacts 14 and 15, the circuit through the coil 19 is momentarily broken. The movable member of this relay, however, has to make a considerable movement before the contacts at 21 are opened, the duration of this movement being sufficient to prevent the slot magnet 10 from being deënergized during the movement of the main relay. This prevents the signal H from going to danger position, while the relay 6 is reversing.

By the provision of a simple form of slow-releasing relay for maintaining the circuit of the slot magnets during the reversal of the main relay, I am enabled to use alternating current slot magnets in a system of wireless control for distant signals in a similar manner to the direct current system now in use.

It will be understood that various forms of the auxiliary relay 18 may be employed for this purpose.

What I claim is—

1. In an alternating current block signal system, a normally closed track circuit, line wires from which the track circuit is energized, means for reversing the polarity of the track circuit, a reversing relay controlled by the reversal of polarity of the track circuit and controlling the operating mechanism for the home and distant signal blades, alternating current slot magnets, and an auxiliary circuit controlling device for holding the circuit of the home signal slot magnet closed while the relay is reversing; substantially as described.

2. In alternating current block signaling system of the character described, a main reversing relay, a slot magnet for the home signal, and an auxiliary circuit-controlling device for maintaining the circuit of the slot magnet closed while the relay is reversing; substantially as described.

3. In an automatic block signaling system using alternating current, a closed track circuit, a reversing relay controlled thereby, home and distant signal blades, an actuating motor therefor, alternating current slot magnets, an auxiliary circuit-closing device for holding the circuit of the home signal slot magnets closed while the relay is reversing; substantially as described.

4. In an alternating current block signaling system of the character described, a slot magnet, a reversing relay and an auxiliary device for maintaining the circuit of the slot magnet while the relay is reversing; substantially as described.

5. In an alternating current block signaling system of the character described, an alternating current slot magnet, a reversing relay, and an auxiliary device controlled by the track circuit for maintaining the circuit of the slot magnet while the relay is reversing; substantially as described.

6. In an alternating current block signaling system of the character described, home and distant signal blades, a reversing relay through which said blades are controlled by the track circuits, a line circuit, and an alternating current slot magnet, and a slow motion circuit controlling device for controlling the circuit of said magnet; substantially as described.

In testimony whereof, I have hereunto set my hand.

DANIEL J. McCARTHY.

Witnesses:

A. HERMAN WEGNER,

R. L. KISTLER.

Copies of this patent may be obtained for five cents each, by addressing the "Commissioner of Patents, Washington, D. C."